(12) United States Patent
    Martinez

(10) Patent No.: US 9,303,849 B1
(45) Date of Patent: Apr. 5, 2016

(54) FLAT PANEL CONCEALMENT APPARATUS WITH A GRAPHIC AND AMBIENT LIGHT METHOD

(71) Applicant: Marvin Leon Martinez, Thornton, CO (US)

(72) Inventor: Marvin Leon Martinez, Thornton, CO (US)

( * ) Notice: Subject to any disclaimer, the term of this patent is extended or adjusted under 35 U.S.C. 154(b) by 37 days.

(21) Appl. No.: 13/922,727

(22) Filed: Oct. 4, 2013

(51) Int. Cl.
   *F21V 21/00* (2006.01)
   *F21V 33/00* (2006.01)
   *A47G 1/06* (2006.01)
   *F21W 131/304* (2006.01)

(52) U.S. Cl.
   CPC .............. *F21V 21/00* (2013.01); *A47G 1/0622* (2013.01); *F21V 33/0032* (2013.01); *F21W 2131/304* (2013.01)

(58) Field of Classification Search
   CPC ... A47G 1/0622; F21V 33/0032; F21V 21/00; F21W 2131/304
   USPC ...................... 362/632, 368; 349/122; 40/715
   See application file for complete search history.

(56) References Cited

U.S. PATENT DOCUMENTS

| | | | |
|---|---|---|---|
| 6,532,152 B1* | 3/2003 | White | G02F 1/133308 312/223.1 |
| 6,845,578 B1* | 1/2005 | Lucas | 40/427 |
| 7,766,536 B2* | 8/2010 | Peifer et al. | 362/633 |
| 7,883,252 B2* | 2/2011 | Matsui et al. | 362/612 |
| 2006/0221632 A1* | 10/2006 | Hsu | 362/604 |
| 2007/0056201 A1* | 3/2007 | Price et al. | 40/725 |
| 2008/0120882 A1* | 5/2008 | Mueller | B44F 1/06 40/714 |
| 2009/0273660 A1* | 11/2009 | Regen | H04N 7/142 348/14.02 |
| 2010/0276562 A1* | 11/2010 | Nguyen | 248/488 |
| 2011/0216488 A1* | 9/2011 | Perry | H05K 5/00 361/679.01 |
| 2012/0320622 A1* | 12/2012 | Sanders | 362/602 |

* cited by examiner

*Primary Examiner* — Peggy Neils
(74) *Attorney, Agent, or Firm* — Patent Law Offices of Rick Martin, P.C.

(57) ABSTRACT

A flat panel concealment apparatus with a graphic and ambient light method. The concealment apparatus comprises of a housing structure for positioning about the display with which has wider sides than top and bottom and an opening aligned for visual access to the flat panel display. A film that is placed on front of apparatus for visual graphics. A means for mounting apparatus to a wall mounted flat panel display. A continuous light method on back of apparatus for purposes of backlighting to reduce eye strain.

10 Claims, 7 Drawing Sheets

FLAT PANEL CONCEALMENT APPARATUS WITH A GRAPHIC AND AMBIENT LIGHT METHOD

Figure 1:
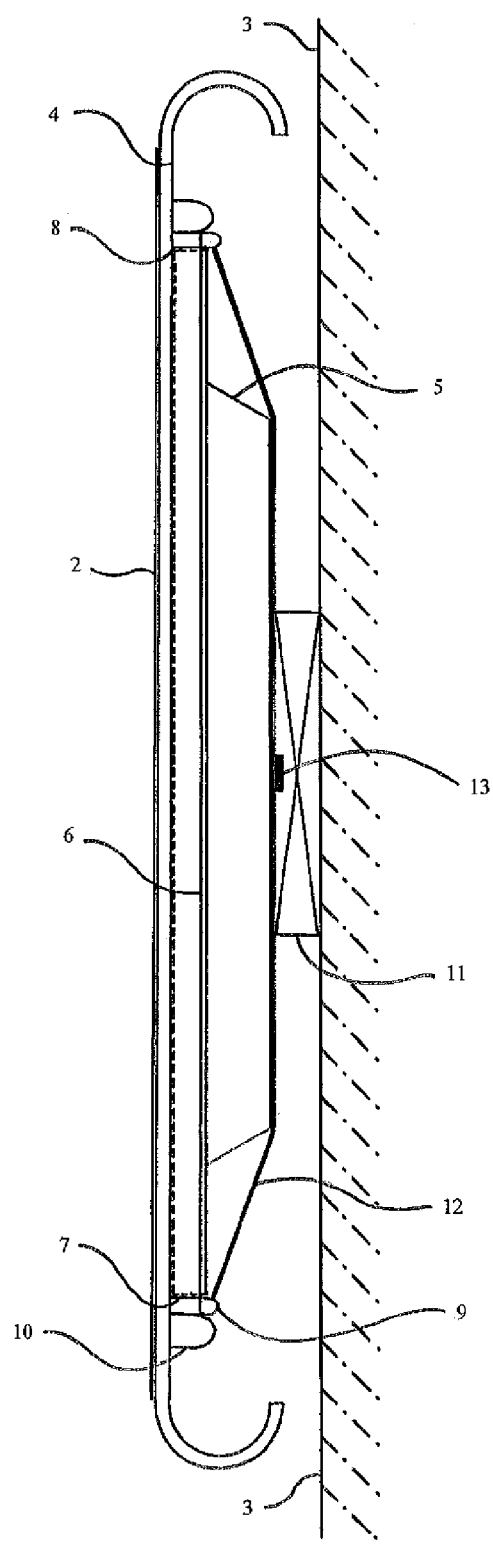

The invention allows not only the concealment of flat panel televisions & computer displays but the opportunity to customize the graphics for intended use while reducing eye strain through ambient light surrounding the display. This is a three prong solution for which is a much needed problem for home owners, retailers, advertisers and anyone needing to conceal their flat panel television or computer display while providing the ever expanding use of customization in today's market.

Relevant prior art includes:
U.S. Pat. No. 7,471,804 December, 2008 Lee
U.S. Pat. No. 7,884,814 February, 2011 Graham
U.S. Pat. No. 6,817,128 November, 2004 Korpai
U.S. Pat. 2010/0229441 September, 2010 Byfield
U.S. Pat. No. 4,329,716 May, 1982 Porco
U.S. Pat. No. 6,709,078 March, 2004 Johnson
U.S. Pat. No. 7,287,737 October, 2007 Rossi
U.S. Pat. 2004/0064986 April, 2004 Anderson
U.S. Pat. 2007/0046841 March, 2007 Jacobsmeyer
U.S. Pat. 2009/0053685 February, 2009 Common
U.S. Pat. 2011/0153526 June, 2011 Hochhalter
U.S. Pat. No. 6,901,987 June, 2005 Graham
U.S. Pat. 2006/0000135 January, 2006 Yoon
U.S. Pat. 2007/0056201 March, 2007 Price
U.S. Pat. 2008/0236015 October, 2008 Fleming
U.S. Pat. 2010/0276562 November, 2010 Nguyen History:

In 2002 I began to experiment with a different type of frame for my art work, Painting's, drawings, watercolors, etc. As I looked at different styles of frames for my Painting's I discovered that the traditional kind of frames that were on the market just did not convey the style or look I was going for. Through this trial and error and many days working in the shop I came up with this certain style of frame. This style came from me wanting to use monolithic wide flat glossy sides with thinner glossy sides on above and below my paintings. Nothing had been done like this before and I found it very appealing to the eye. Giving space between the art and frame really put a focus on the art so the focus would be strictly on the art and not on the frame or the surrounding wall it would be placed on. At that time I built two prototypes of my invented frames out of wood and standard household paint and gloss. I used these for my art for a couple years and then it dawned on me. With Flat panel televisions and computer displays really coming of age in the market place how could I create an apparatus that not only concealed these devices but placed art on the frame so it would fit into any décor. Then I took it a step further and discovered that not only could this be used in home décor but it could be used by homeowners, businesses for advertising, billboards, tradeshows, hospitals, hotels, etc. The applications it can be used for is limitless. Then with eye strain being so dominant in today's society I decided to add ambient lighting to ease that eye strain on the body and mind. This is how I came about to producing my current prototype of the flat panel concealment apparatus with a graphic and ambient light method.

Advantages:

One advantage is the concealment of these flat panel televisions and computer displays. Most of these devices are not aesthetically pleasing in an environment that may otherwise be aesthetically decorated. This invention not only is aesthetically pleasing to the eye but allows access to the flat panel television or computer display without interfering with the ventilation and cooling during operation.

Another advantage of the invention is as flat panel televisions and computer displays become common place in the market place currently there is no way to customize these devices to go with the interior design scheme of a room or the advertising program for any business. The monolithic construction on each side of the frame allows for a greater customizable surface for an advertising campaign or a graphic solution for home decor.

Another advantage to the present mechanism is the relief of Asthenopia or eye strain by creating ambient light which surrounds the flat panel television or computer display. Studies have shown that prolonged viewing of flat panel televisions or computer displays leads to visual discomfort, fatigue, blurred vision and even headaches. Creating a soft not overpowering ambient light around such devices creates a soothing non glaring effect on the eyes which in turn helps with Asthenopia.

DRAWINGS

Figures

FIG. 1—is a side elevation view of a flat panel concealment apparatus with a graphic and ambient light method mounted on a flat screen television.

Figure 2:
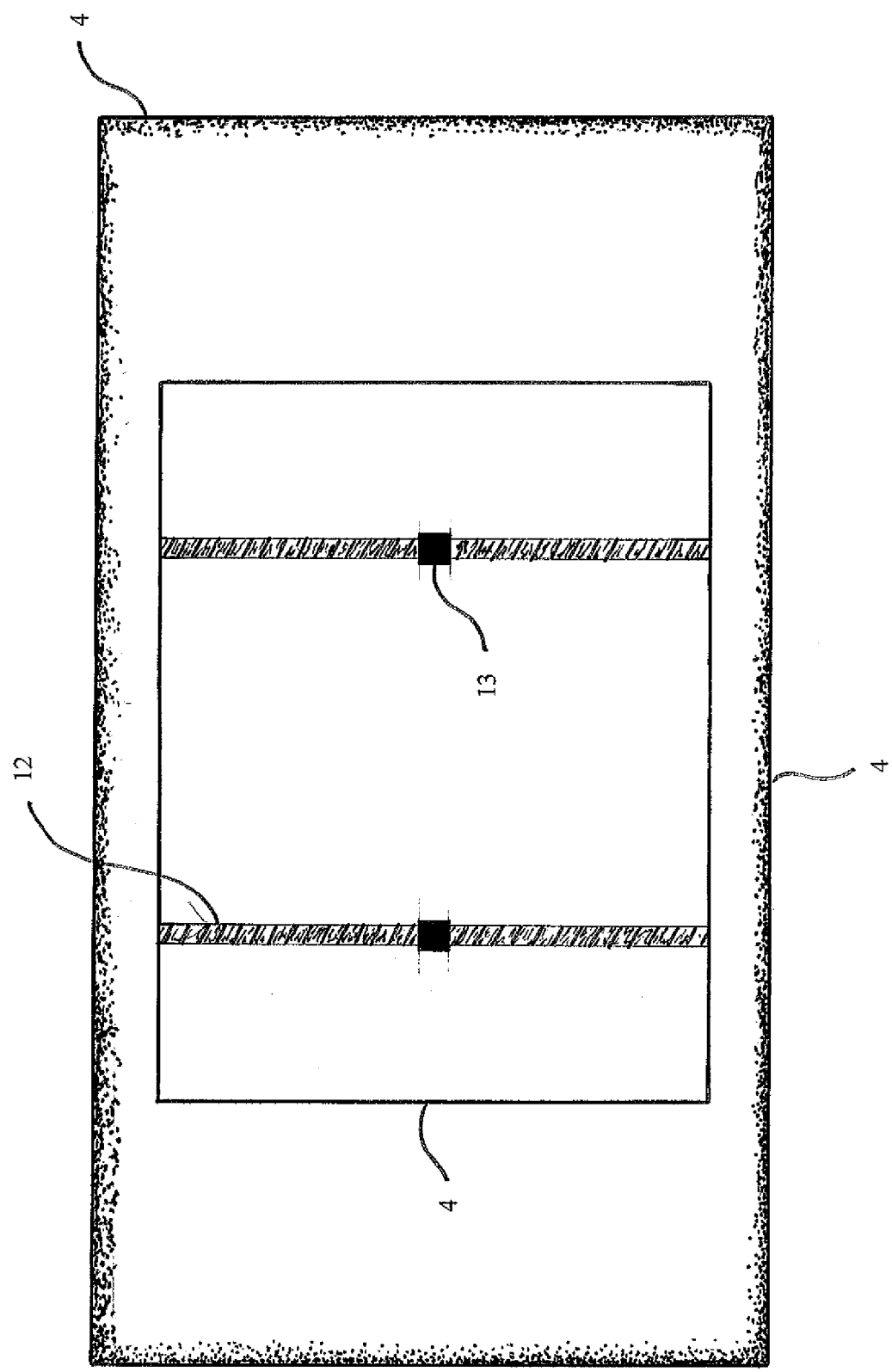

FIG. 2—is a front view drawing of the flat panel concealment apparatus with a graphic and ambient light method without the graphic and display and without the flat screen television.

Figure 3:
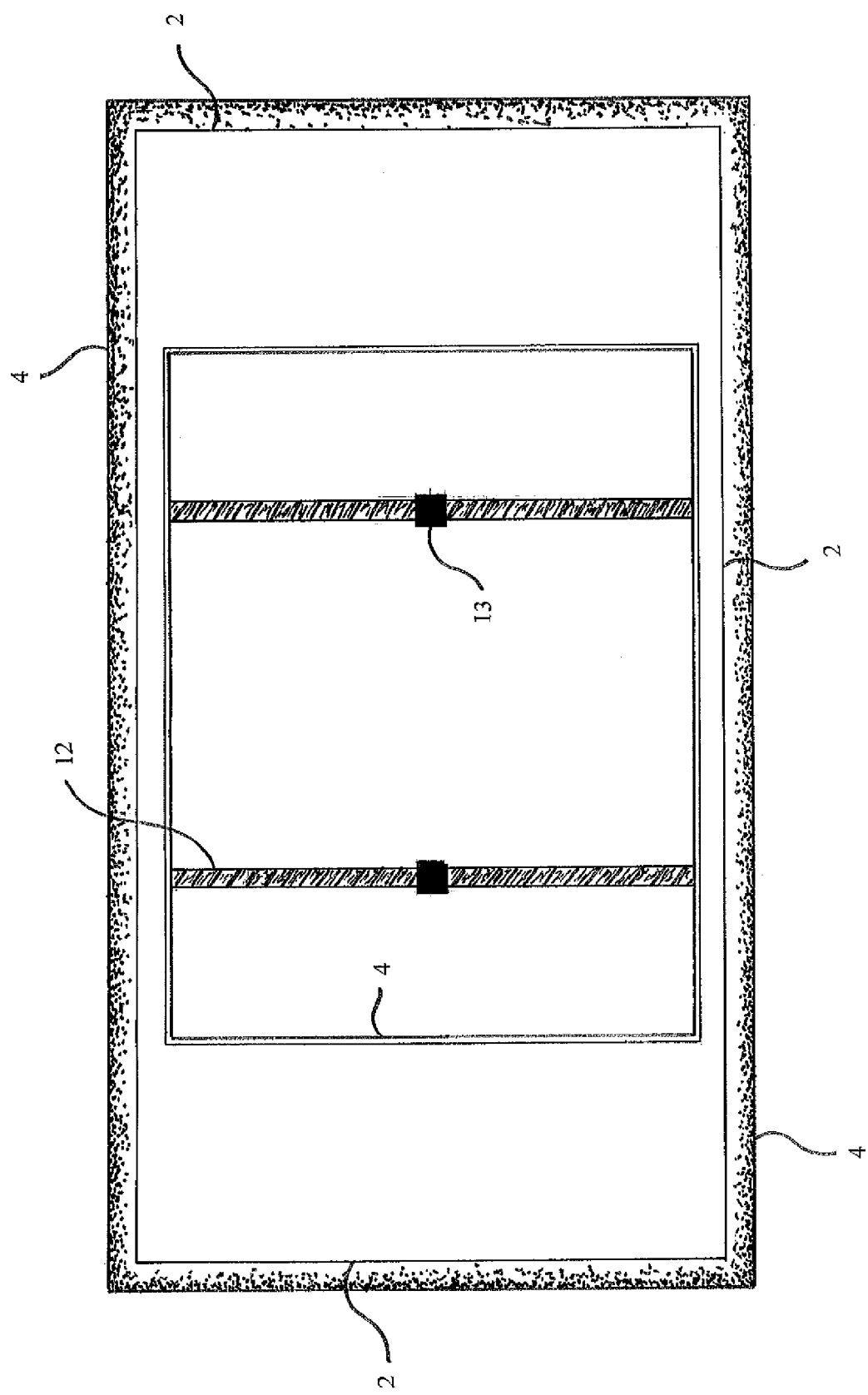

FIG. 3—is a front view drawing of the flat panel concealment apparatus with a graphic (2) and ambient light method and without the flat screen television.

Figure 4:
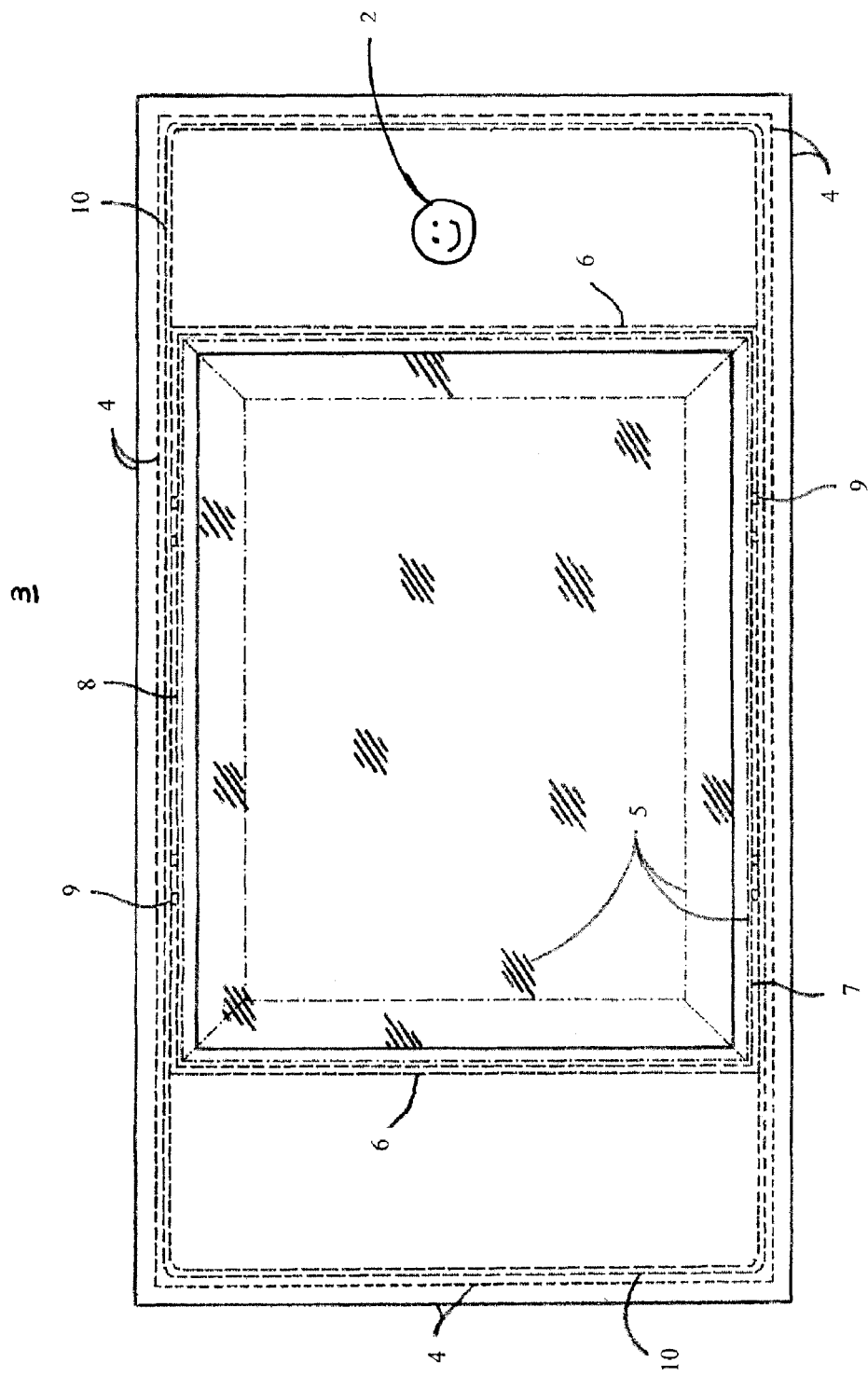

FIG. 4—is a front elevation view of the flat panel concealment apparatus with a graphic (2) and ambient light method (4) with the display 5, an electronic display.

Figure 5:
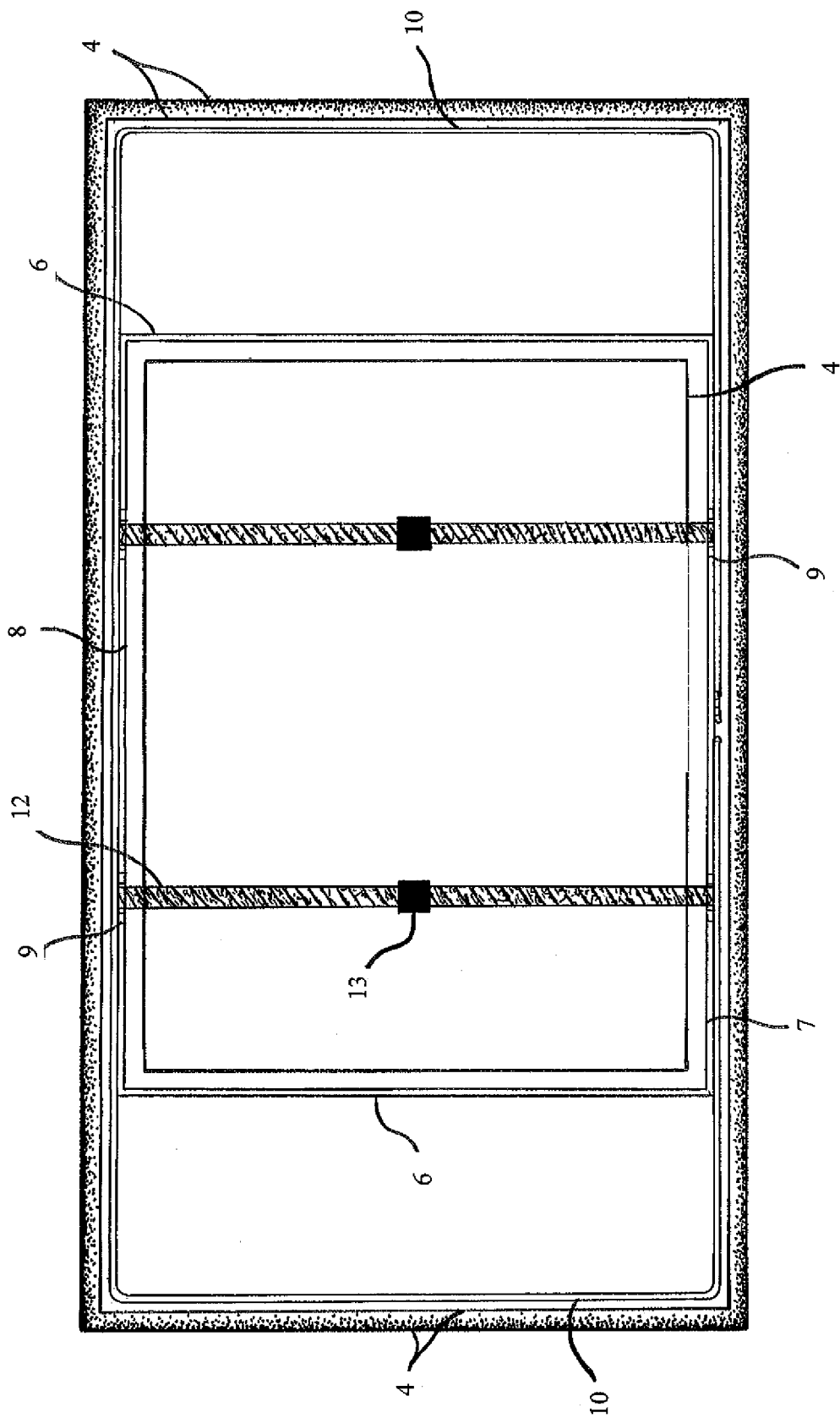

FIG. 5—is a rear elevation view of the flat panel concealment apparatus with a graphic and ambient light method without any display.

Figure 6:
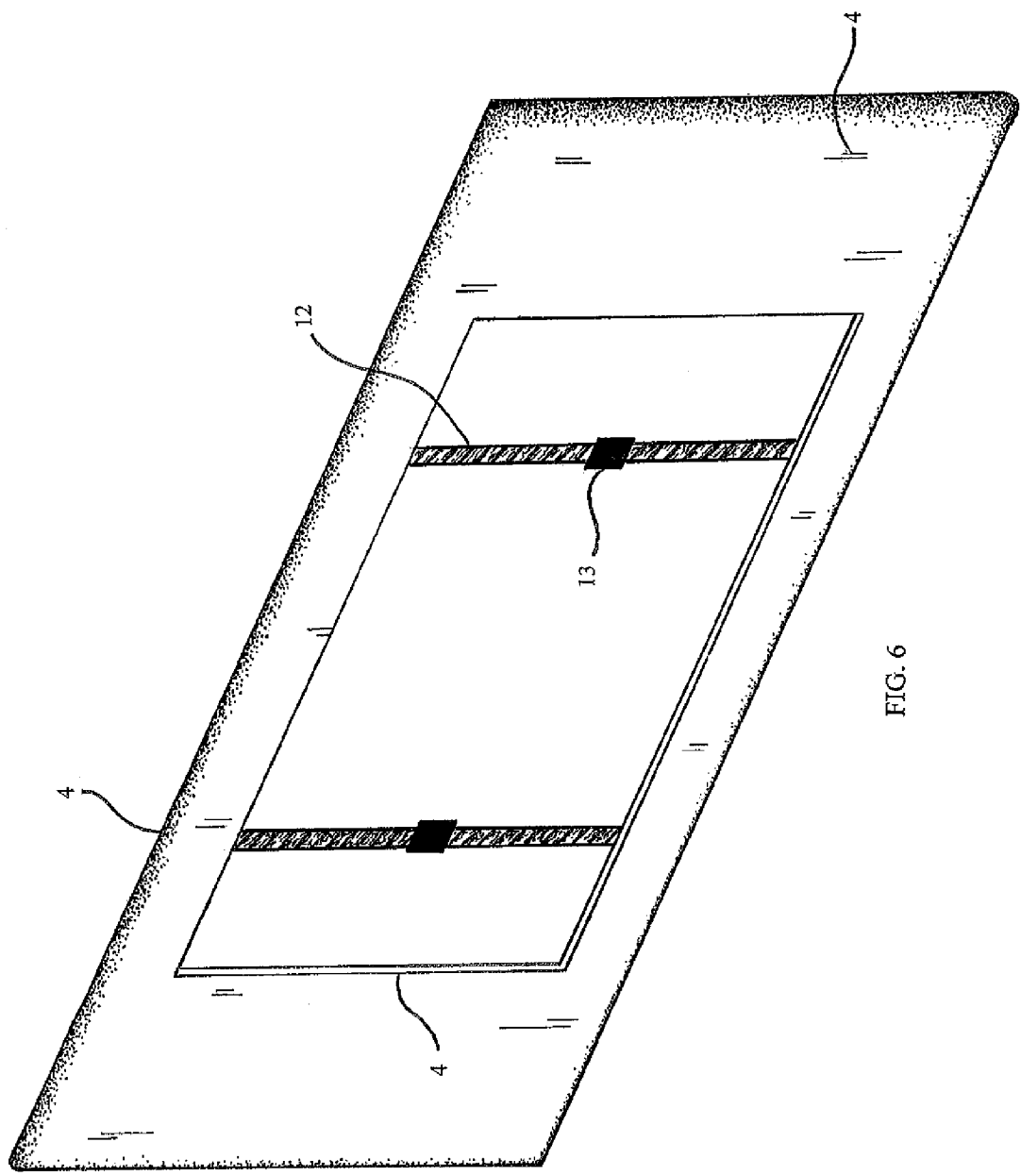

FIG. 6—is an angled view drawing of the flat panel concealment apparatus with a graphic and ambient light method without graphic and without any display.

Figure 7:
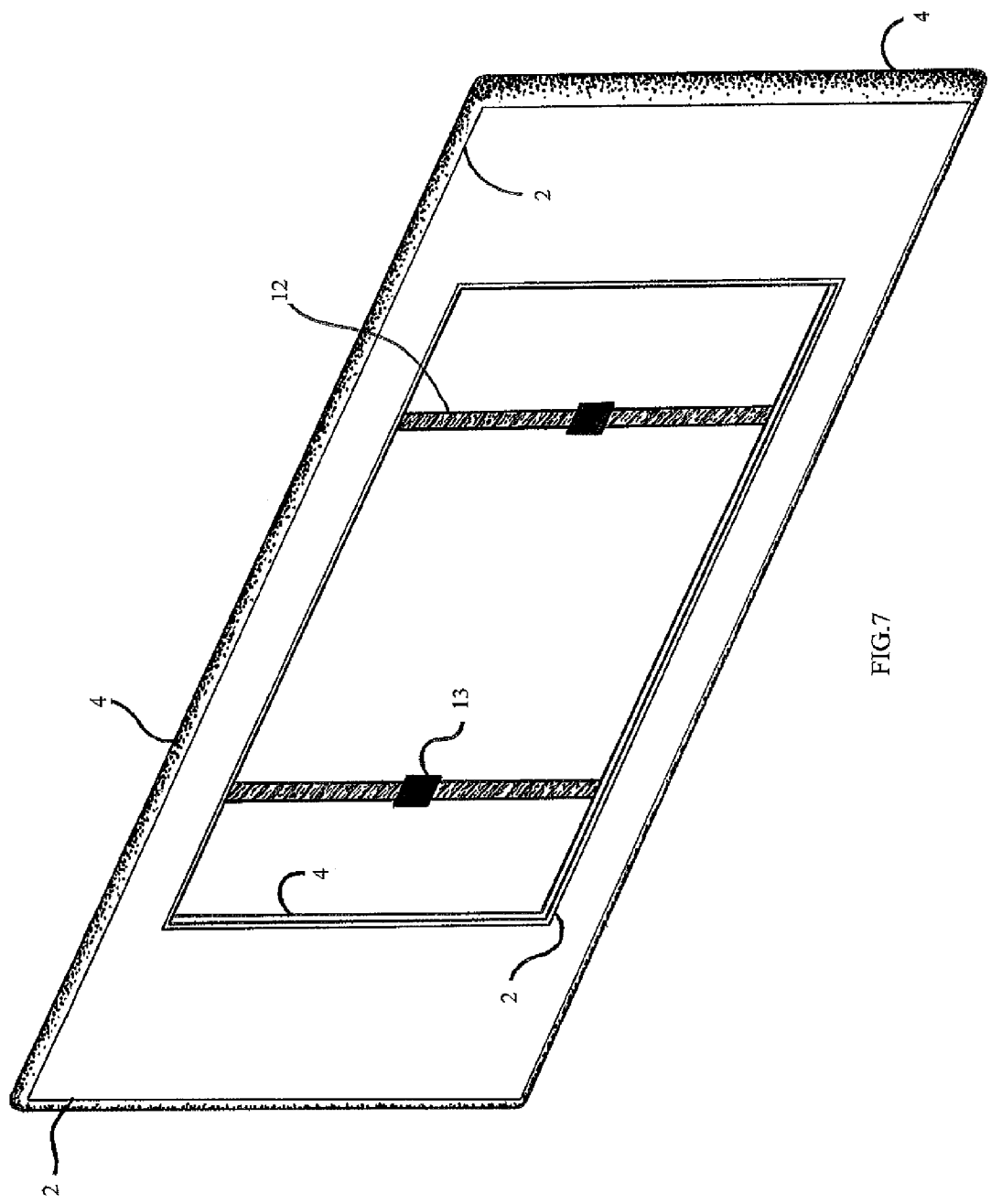

FIG. 7—is a front perspective view of the flat panel concealment apparatus with a graphic and ambient light method and without any display.

DRAWINGS

Reference Numerals

2—graphic
3—wall
4—flat panel concealment apparatus
5—flat panel television or computer display
6—side wall housing
7—lower wall housing
8—upper wall housing
9—strap connector
10—ambient lighting strip
11—flat panel television or computer display mounting device
12—strap
13—strap buckle

DESCRIPTION

FIG. 1 provides a sectional side view of the present flat panel concealment apparatus 4 with a graphic and ambient light method mounted to a wall 3. This invention essentially comprises of a frame 4 that is curved 180 degrees inward all the way around the flat panel television or computer display 5. The side wall housings 6 and upper wall housing and lower wall housing flat panel television or computer display 5 in place so 5 will not move out of position in relation to the frame 4. Strap connectors 9 mounted to upper wall housing and lower wall housing in four spots help hold frame 4 in position to television or display 5. Strap buckle 13 keeps tension tight on strap 12 as to not allow apparatus to break away or to come loose from television or display 5.

Ambient light strip 10 goes 360 degrees around television or display 5 to ensure ambient lighting is distributed evenly for total coverage around edges. The mounting device 11 can be any device that is used to mount to wall 3. Element 2 is the graphic adhesive film, vinyl or substrate used to convey appropriate image or advertisement needed for application.

FIG. 2 provides an example in which the flat panel concealment apparatus has a front view without graphics and display. This view shows frame 4 with curved corners in all four corners. It also shows straps 12 which are held together by strap buckles 13.

FIG. 3 provides an example in which the apparatus has a front view with graphics 2 applied to frame 4. This view also shows frame 4 with curved corners in all four corners. It also shows straps 12 which are held together by strap buckles 13.

FIG. 4 provides a sectional front view of the present flat panel concealment apparatus 4. This view also includes the ambient light strip 10 that goes all the way around back side of apparatus. This view also includes the side wall housings 6 and upper wall housing and lower wall housing which hold in place display 5 in place so it will not move out of position in relation to frame 4. Also included in this view are the strap connectors 9 in relation to position on lower wall housing and upper wall housing.

FIG. 5 provides a sectional back view of the present flat panel concealment apparatus 4. This view also includes the ambient light strip 10 that goes all the way around back side of apparatus. This view also includes the side wall housings 6 and upper wall housing and lower wall housing which hold in place display 5 in place so it will not move out of position in relation to frame 4. Also included in this view are the strap connectors 9 in relation to position on lower wall housing and upper wall housing.

FIG. 6 provides a front angled view example in which the flat panel concealment apparatus has a front angled view without graphics and display. This view shows frame 4 with curved corners in all four corners. It also shows straps 12 which are held together by strap buckles 13.

FIG. 7 provides a front angled view example in which the flat panel concealment apparatus has a front angled view with graphics and without display. This view shows frame 4 with curved corners in all four corners. It also shows straps 12 which are held together by strap buckles 13.

The construction and size principle of operation utilized by the present flat panel concealment apparatus with a graphic and ambient light method is not limited by this present size or manufacturing process. Alternatively, it may be applied to any size or manufacturing means (e.g., billboards, signs, advertising, televisions, computer displays, projection displays, mobile or vehicle displays, etc.).

What is claimed is:

1. An improvement for an electronic display having a flat outer front display screen and a straight top frame edge, a parallel bottom frame edge and parallel side frame edges, the improvement comprising: a flat frame surrounding the straight top frame edge, the bottom frame edge and the side frame edges; said flat frame having flat facial panels extending outbound from the straight top frame edge, the bottom frame edge and the side frame edges; said flat frame having a central hole sized to provide a full visual access to the electronic display front display screen; said flat frame having a top interior upper frame wall that rests against the straight top frame edge; said flat frame having a strap means attached to a top flat frame anchor and a bottom flat frame anchor functioning to secure the flat frame against the electronic display; a lighting strip fastened around a periphery of the flat frame; and a removable graphic fastened on the flat facial panels.

2. The improvement of claim 1, wherein the flat facial panels further comprise a rear facing curved section that prevents a visual viewing of a side of the electronic display.

3. The improvement of claim 1, wherein the lighting strip is located on a rear surface of the flat frame.

4. The improvement of claim 1, where the removable graphic further comprises an adhesive film.

5. The improvement of claim 1, wherein the side flat facial panels each further comprise a rear facing interior wall located to be adjacent the parallel side frame edges of the electronic display.

6. An enhancement frame for an electronic display having a flat front display screen, the enhancement frame comprising; a one piece flat frame sized to surround the flat front display screen; said one piece flat frame having flat facial panels extending outbound from a central hole forming a top, a bottom, a left and a right flat facial area; said central hole sized to surround the flat front display screen; said one piece flat frame having a top interior upper frame wall extending rearward sized to rest upon a top ledge of the electronic display flat front display screen; said one piece flat frame having a strap means attached to a first facial area and attached to an opposite second facial area functioning to secure the one piece flat frame against the electronic display; a lighting strip fastened around a periphery of the flat frame; and a removable graphic fastened on the flat facial panels.

7. The enhancement frame of claim 6, wherein the flat facial panels further comprise a rear facing curved section.

8. The enhancement frame of claim 6, wherein the lighting strip is located on a rear surface of the one piece flat frame.

9. The enhancement frame of claim 6, wherein the removable graphic further comprises an adhesive film.

10. The enhancement frame of claim 6, wherein the left and the right facial area each further comprise a rear facing interior wall located to be adjacent the electronic display.

\* \* \* \* \*